Dec. 12, 1944.  S. R. HOWARD  2,364,902
WEIGHING MACHINE
Filed July 16, 1940  5 Sheets-Sheet 1

INVENTOR
Stanley R. Howard
BY J. Stanley Churchill
ATTORNEY

Dec. 12, 1944.  S. R. HOWARD  2,364,902
WEIGHING MACHINE
Filed July 16, 1940                5 Sheets-Sheet 2

INVENTOR
Stanley R. Howard
BY
J. Stanley Churchill
ATTORNEY

Dec. 12, 1944.  S. R. HOWARD  2,364,902
WEIGHING MACHINE
Filed July 16, 1940  5 Sheets-Sheet 3

INVENTOR
Stanley R. Howard
BY
J. Stanley Churchill
ATTORNEY

Dec. 12, 1944.　　　　S. R. HOWARD　　　　2,364,902
WEIGHING MACHINE
Filed July 16, 1940　　　　5 Sheets-Sheet 4
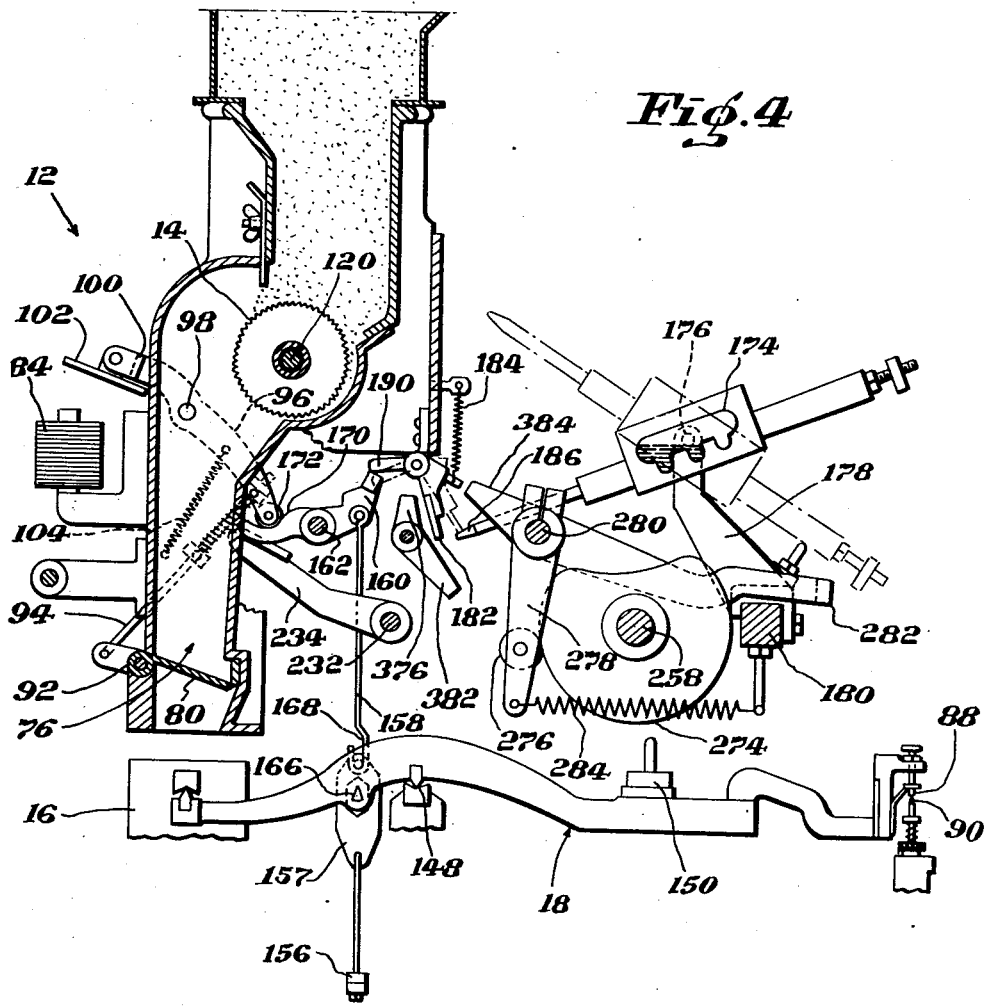
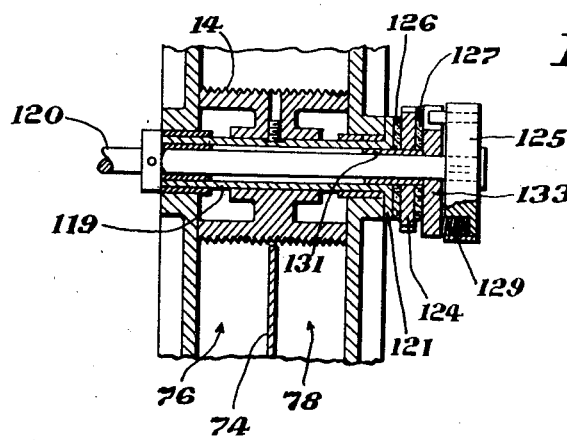
INVENTOR
Stanley R. Howard
BY J. Stanley Churchill
ATTORNEY Dec. 12, 1944.    S. R. HOWARD    2,364,902
WEIGHING MACHINE
Filed July 16, 1940    5 Sheets-Sheet 5
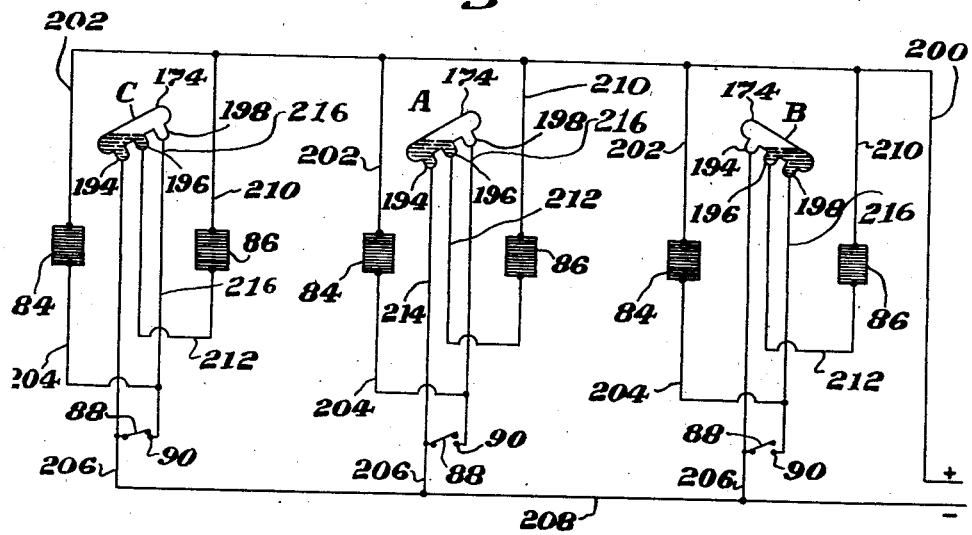
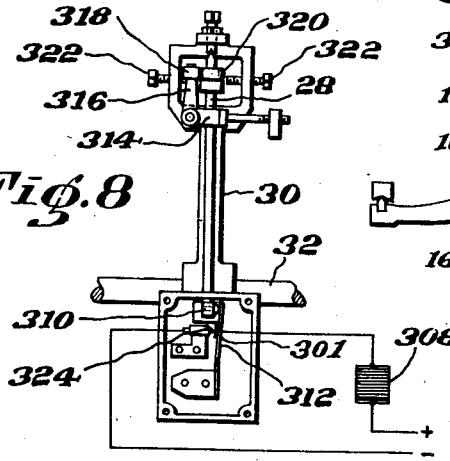
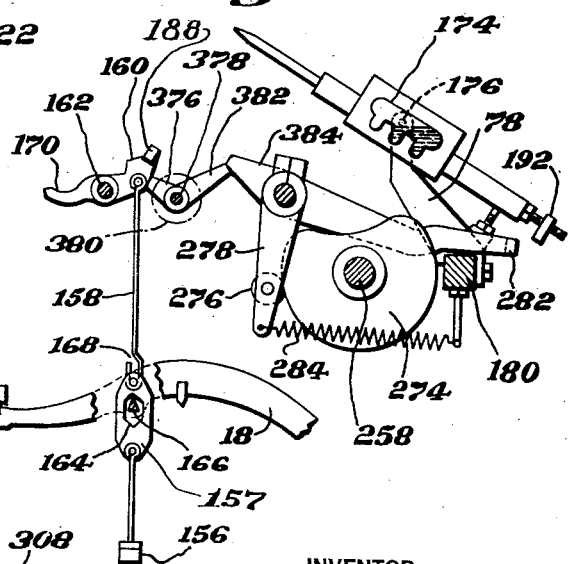
INVENTOR
Stanley R. Howard
BY J. Stanley Churchill
ATTORNEY Patented Dec. 12, 1944

2,364,902

UNITED STATES PATENT OFFICE 2,364,902

WEIGHING MACHINE

Stanley R. Howard, Milton, Mass., assignor to Pneumatic Scale Corporation, Limited, Quincy, Mass., a corporation of Massachusetts Application July 16, 1940, Serial No. 345,749

18 Claims. (Cl. 249—22)

This invention relates to a weighing machine.

In general, the invention has for an object to provide a novel and improved weighing machine, and more particularly an automatic net weight weighing machine which is adapted to handle, weigh and package flowable solid material in an efficient, rapid, accurate and economical manner.

With this general object in view and such others as may hereinafter appear, the invention consists in the weighing machine and in the various structures, arrangements and combinations of parts hereinafter described and particularly defined in the claims at the end of this specification.

Figure 1:
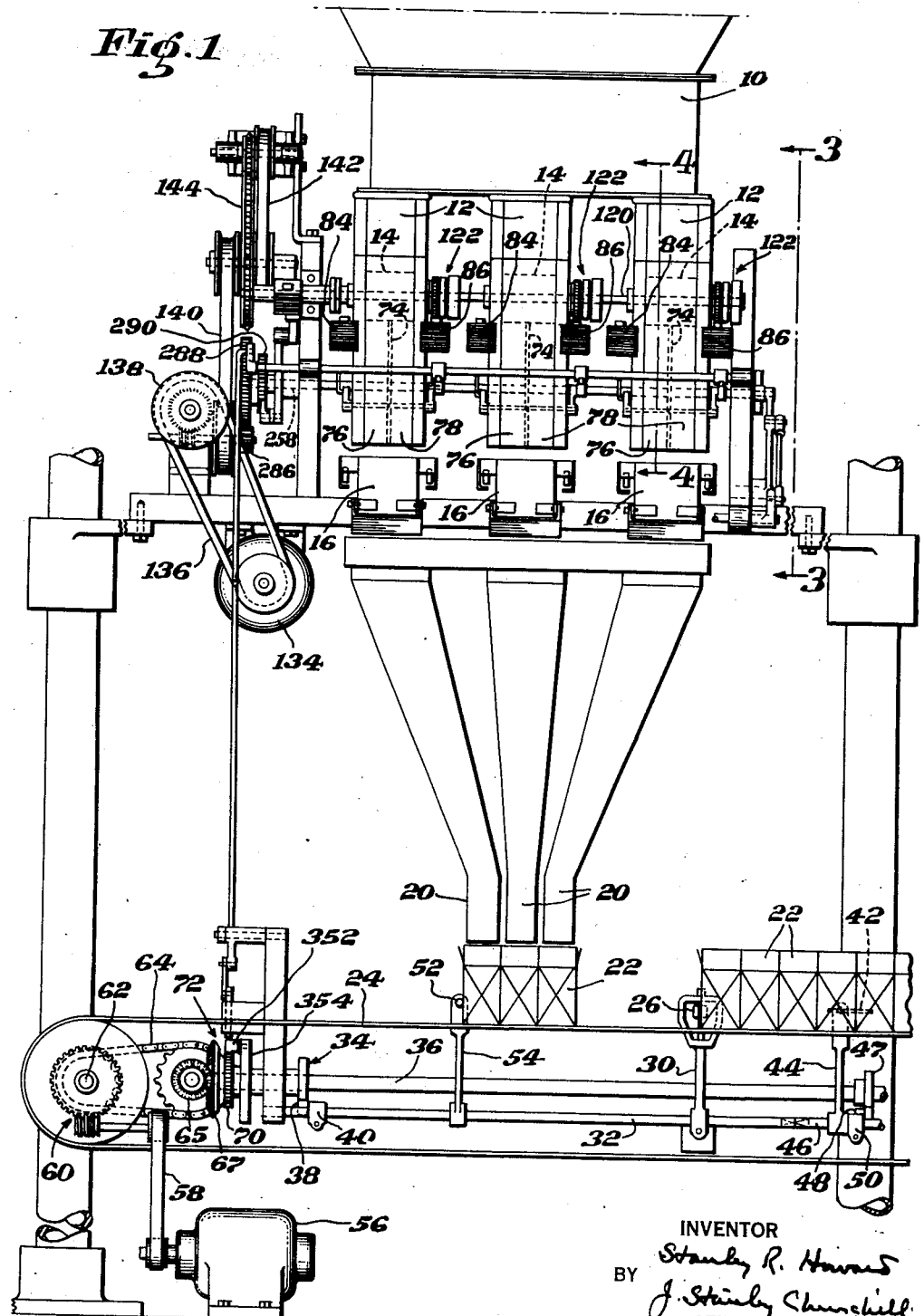
Figure 2:
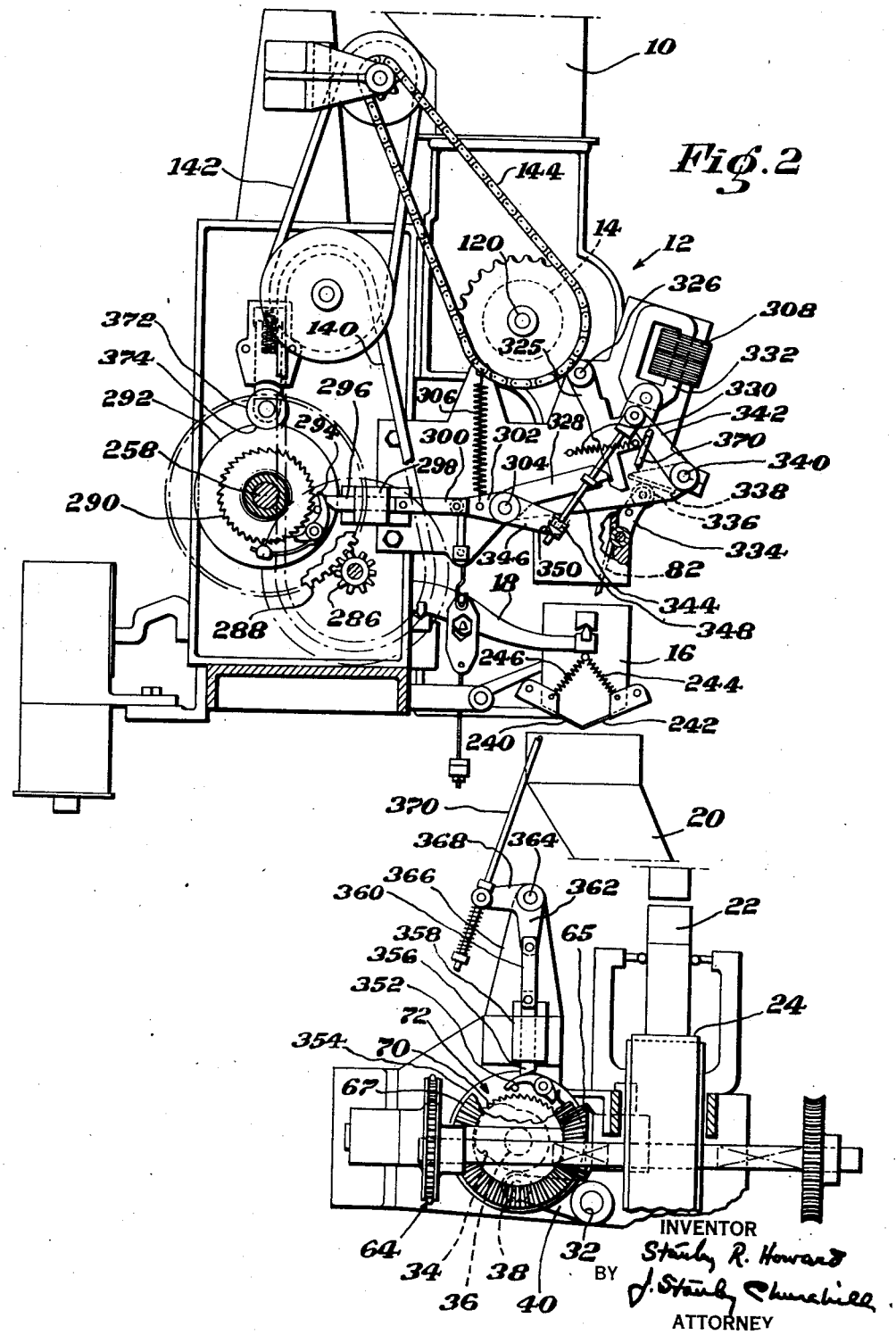
Figure 3:
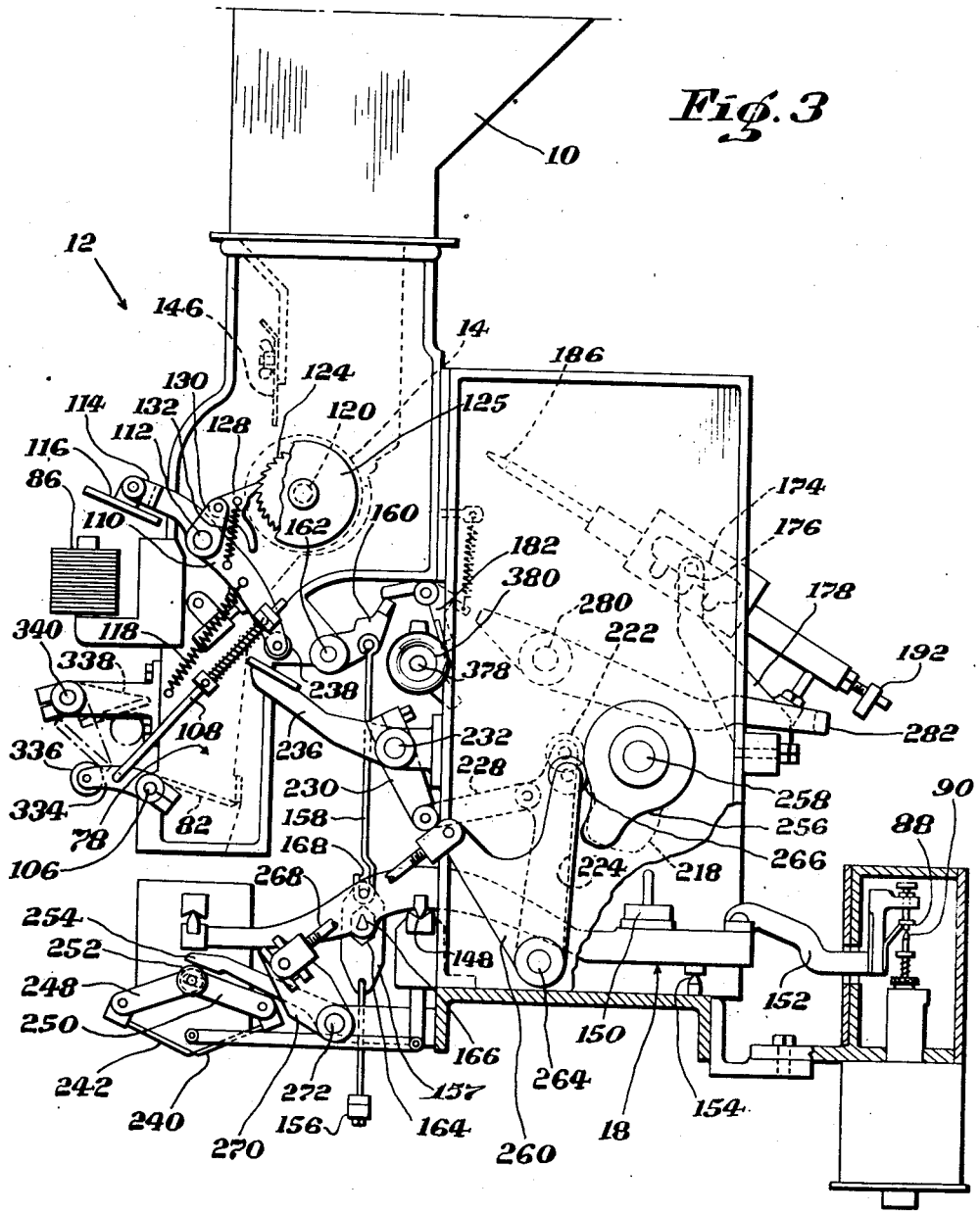

In the drawings illustrating the preferred embodiment of the invention, Fig. 1 is a front elevation of a machine embodying the present invention; Fig. 2 is a side elevation as viewed from the left in Fig. 1; Fig. 3 is a side elevation as viewed from the right on the line 3—3 of Fig. 1 and showing the drip feed control mechanism; Fig. 4 is a cross-section on the line 4—4 of Fig. 1 through one of the feed hoppers and showing the primary or load feed control mechanism; Fig. 5 is a cross-sectional view through one of the feeding drums; Fig. 6 is an electrical diagram showing a circuit for controlling the feed of the material to the weighing scales; Figs. 7 and 8 are plan and side elevational views respectively of control mechanism to be referred to; and Fig. 9 illustrates the control mechanism shown in Fig. 4 in locked position for operating the machine to weigh one load per cycle of operation.

In general, the illustrated weighing machine comprises a multi-unit machine, each unit including mechanism for withdrawing flowable solid material from a bulk supply and weighing the same in receptacles on the scale beams whereupon the material is released into containers supported upon a conveyer disposed beneath the weighing units. One feature of the present invention resides in the provision for performing two weighing operations on each scale beam during each cycle of operation of the machine, that is, to first weigh a bulk or primary load into the receptacle on the scale beam, and then to weigh the drip or final load into the receptacle. Heretofore, in prior multi-unit weighing machines of which I am aware, the bulk and drip cycles of operation were each started at the same time, that is, each weighing unit weighed its bulk load and then came to rest, with its feed gates closed, and waited until all the scales in the group had completed their bulk or primary weighing operation. Thereafter, the gates were all opened together so that all the weighing units started their drip or final weighing operation at the same time.

The present invention contemplates a multi-unit weighing machine of the type operating to perform the weighing operation in successive cycles, each cycle comprising a bulk weighing operation and a drip weighing operation, in which provision is made for permitting each individual weighing unit to complete its entire cycle of operation, including the bulk and drip weighing operations, independently of the other weighing units, whereby the delay formely occasioned by simultaneous resetting of the weighing units after each bulk period of weighing is eliminated.

Another feature of the invention resides in the novel construction and operation of the feeding hopper whereby to enable a more uniform drip stream to be fed and resulting in more accurate weighing operation. Heretofore, when weighing relatively large amounts of material, in order to feed the required volume of material in a relatively short time, a relatively wide feed hopper was required which produced a wide stream. In cutting down the stream to produce the drip stream, the width of such stream was maintained while the thickness of the stream was reduced. In practice, it was found that there was a limit to the extent that the stream could be reduced in thickness and still feed a uniform stream. When the stream was reduced below a predetermined minimum thickness, the stream would begin to break and feed irregular and variable quantities. In accordance with the present invention, the feed hopper is divided longitudinally and provided with independently operated gates for each compartment so that by closing one gate, the width of the stream may be reduced while maintaining the thickness thereof sufficient to establish a uniform drip stream, and hence enabling more accurate weights to be produced.

In the illustrated machine, provision is made for reducing the supply of material fed to the scale when the bulk weight is reached and for cutting off the supply when the drip or final weight is reached and in the preferred embodiment of the invention, the feed hopper is divided longitudinally to provide two passageways fed by a common rotating drum, each passageway being provided with an individual scale controlled shut off gate. In the operation of the machine, when the bulk load weight is reached, one of the gates is closed, while the other remains open, continuously feeding material into the scale receptacle, until the final weight is reached, whereupon the second gate is closed to complete the weighing operation. Upon completion of the final weighing operation the feed drum is stopped. During the final weighing operation, the feed drum operates to accumulate material in the closed passageway of the hopper to be released into the hopper during the succeeding cycle of operation of the machine.

In the preferred embodiment of the invention, in order to enable each weighing unit to perform two weighing operations, provision is made for increasing the effective counterweight after the primary weight has been reached so as to permit the scale beam to return to weighing position to perform the final weighing operation. In the preferred embodiment of the invention, the feeding hopper gates are controlled by the tripping of the scale beam, and in order to enable one gate to be closed by the first movement of the scale beam, while maintaining the second gate open, and to then close the second gate when the scale is tripped the second time, an electrical circuit is provided including a switch for each weighing unit arranged to be actuated by movement of the scale beam, and a pair of electromagnets which operate to hold their respective hopper gates open during the weighing operation. Upon completion of the primary load weighing operation when the scale beam switch is tripped, one electromagnet is deenergized to permit the first hopper gate to be closed whereupon the scale beam is returned to weighing position to reset the scale beam switch. Provision is made for maintaining the circuit through the second electromagnet to hold the second hopper gate open when the scale is tripped the first time and for shunting the current through a different circuit while the scale beam returns to weighing position in order to enable the second electromagnet to be deenergized upon tripping of the scale beam during the final weighing operation. Thus, during a complete weighing operation, the scale beam switch is operative to close first one gate during the primary weighing operation and then the second gate during the final weighing operation.

Provision is also made in the preferred embodiment of the invention for locking the circuit shunting mechanism whereby to permit both hopper gates to close simultaneously thereby enabling the machine to perform a single weighing operation during each cycle of operation when desired. Provision is also made for controlling the machine so that a new cycle of operation cannot start until all the scales have made their weight and until the packages are in position to receive the material weighed during the previous cycle.

Referring now to the drawings, 10 represents a storage hopper for the bulk supply of material to be weighed and from which the material flows by gravity into the individual material feeding hoppers indicated generally at 12. Each material feeding hopper 12 is provided with a rotary drum 14 by which the material is fed through the hopper to be received by a receptacle 16 disposed upon the weighing end of a scale beam 18. In the operation of the machine, when the receptacles 16 have received their final load and all the scale beams have been tripped, the receptacles are arranged to be opened to release their material which is permitted to flow through funnels or guide chutes 20 into cartons 22 disposed therebeneath.

The cartons are supported upon a conveyer belt 24 which is arranged to convey the cartons from a supply thereof, or from a preceding carton machine, into a position beneath the funnels 20 to receive the material. As shown in Fig. 1, provision is made for separating the line of cartons 22 into groups corresponding to the number of funnels 20. The main line of cartons is arranged to come to rest against a pivotal stop member 26 secured to the top of a vertical rod 28 pivotally mounted in a rocker arm 30 fast on a rocker shaft 32. The stop member 26 is normally disposed in a position at right angles to the oncoming cartons and the latter operate to move the pivotal member 26 to actuate control mechanism arranged to prevent the machine from starting until the cartons have come into position against the stop, as illustrated in detail in Figs. 7 and 8 and which will be hereinafter more fully described.

In order to release the line of cartons to permit the requisite number to be conveyed into position under the funnel 20, provision is made for rocking the arm 30 to remove the stop member 26 from the path of the cartons, and as herein shown, a cam 34, fast on a cam shaft 36, is arranged to cooperate with a roller 38 mounted on a cam lever 40 fast on the rocker shaft 32. A second stop member 42 is provided which is arranged to engage the line of cartons in back of the group to delay the movement thereof until the preceding cartons forming the group have passed beyond the stop member 26. The stop member 42 is carried by a rocker arm 44 which is fast upon a second rocker shaft 46 and the latter is arranged to be rocked by a cam 47 fast on the cam shaft 36 and through connections including a roller 48 and lever 50 fast on the rocker shaft 46, as shown in Fig. 1. The group of packages thus released comes to rest against a third stop member 52 to present the group beneath the funnels 20 as illustrated. The stop member 52 is carried by an arm 54 fast on the rocker shaft 32 and is operated simultaneously with the rocker arm 30 in order to release the filled cartons and to be returned to position in the path of a succeeding group for a subsequent cycle of operation.

The conveyer belt 24 is driven continuously from a motor 56 through connections including a belt and pulley drive 58 and a worm and gear drive 60, as shown in Fig. 1. The conveyer cam shaft 36 is driven from the pulley shaft 62 through a chain and sprocket connection 64 and through bevel gears 65, 67, the latter being formed integrally with a ratchet 70 mounted free to turn on the cam shaft 36. The ratchet 70 forms one member of a pawl and ratchet driving mechanism indicated generally at 72, see Fig. 2, arranged to be actuated through connections from the weighing units, to permit the cam shaft 36 to make one revolution during each cycle of operation of the weighing machine, as will be hereinafter described.

Referring now to Figs. 3, 4 and 5, each material feeding hopper 12 is divided longitudinally by a partitioning member 74 to provide two passageways 76, 78 through which the material passes to be delivered into the receptacle 16. Each passageway is provided with its individual gate 80, 82, both of which are arranged to be opened to permit material to be fed to the scale receptacle at the beginning of each cycle of operation. During the weighing operation, each gate is arranged to be closed independently of the other, one gate being closed at the end of the primary weighing period and the other being closed at the end of the final weighing period. The gates 80, 82 are held in their opened position during the weighing operation through connections to electromagnets 84, 86 forming part of a circuit diagrammatically illustrated in Fig. 6. The circuit is arranged to be broken at contacts 88, 90 when the scale beam 18 is moved by the weight of the material in the receptacle during the primary or bulk weighing period to deenergize the electromagnet 84 whereupon the gate 80 is automatically closed. Thereafter, the scale beam 18 returns to its weighing position, as will be described, to reestablish the contacts 88, 90. Provision is made, as will be described, for maintaining the circuit closed through the electromagnet 86 during the primary loading operation and to shunt the current through the contacts 88, 90 during the final weighing operation so that when the contacts 88, 90 are broken the second time, that is, during the final weighing operation, the electromagnet 86 will be deenergized to release its respective gate 82 upon tripping of the scale beam 18 at the end of the final weighing operation.

As illustrated in Fig. 4, the gate 80 which is arranged to close the passageway 76, is pivotally mounted at 92 in the hopper frame, and is connected by a link 94 to one arm 96 of a two-armed lever rockingly mounted on a stud 98 secured to the hopper. The second arm 100 of the two-armed lever is provided with an armature 102 of the electromagnet 84. The electromagnet 84 when energized, operates to hold the gate 80 in its open position, and when deenergized, the gate is closed by a spring 104.

Referring now to Fig. 3, the gate 82 which is arranged to close the adjacent passageway 78, is similarly mounted on a pin 106 and is connected by a link 108 to one arm 110 of a two-armed lever pivotally mounted on a stud 112. The second arm 114 of the two-armed lever is provided with a similar armature 116 adapted to engage its electromagnet 86 when the latter is energized to hold the gate open. A similar spring 118 tends to close the gate 82 when the electromagnet is deenergized.

Provision is made for rotating the feed drum 14 continuously during the entire weighing operation and for stopping the movement of the drum at the end of the drip feed weighing period. As herein shown, see Figs. 3 and 5, the feed drum 14 is fixed to an elongated sleeve 119 loosely mounted on a continuously rotated shaft 120. The elongated sleeve is provided with a flanged end 121 and the drum is arranged to be driven through pressure exerted against the flange 121 by a yieldingly engaged friction clutch indicated generally at 122, the driving member 125 being keyed to the shaft 120. A ratchet 124 loosely mounted on a bushing 131 is engaged between friction members 126, 127 arranged to be compressed by the driven member 133, the latter being urged against the ratchet and friction members by springs 129, to effect rotation of the drum 14. As illustrated in Fig. 3, a pivotally mounted pawl 128, carried by an extension 130 of the two-armed lever 110, 114 is arranged to engage the ratchet 124 to stop the drum at the end of the final weighing operation. The pawl is held in engagement with its ratchet by a spring 132. When the two-armed lever is reset, to be held by the electromagnet 86, at the beginning of a new cycle of operation, as will be described, the pawl 128 is rocked beyond the path of the ratchet 124 and the drum 14 is permitted to rotate to feed the material through the hopper.

It will be observed that the drum 14 feeds material continuously into both passageways 76, 78 during the entire weighing operation, and that when the gate 80 is closed, the material being fed into the passageway 76 during the final weighing operation, is permitted to accumulate therein so as to form a bulk load to be released into the scale receptacle 16 at the beginning of the succeeding weighing operation.

Referring now to Figs. 1 and 2, the feed drum shaft 120 is arranged to be driven continuously through connections from a motor 134 which is connected by a belt 136 to a speed reduction unit indicated generally at 138. The speed reduction unit is connected to the shaft 120 through connections including a belt and a pulley drive 140, a second belt and pulley drive 142, and a sprocket and chain connection 144 as clearly illustrated in Figs. 1 and 2.

From the description thus far it will be observed that the feed drum 14 is arranged to be continuously driven through the weighing operation to feed material from the supply hopper 10 through the compartments 76, 78 of each feed hopper 12 and that the gates 80, 82 of each hopper are arranged to be independently operated to permit one gate to be closed during one period of the weighing operation and to subsequently close the second gate when the final load has been introduced into the weighing bucket 16. As illustrated in Fig. 3, an adjustable gate 146 is provided above the feed drum 14 in order to control the amount of material being withdrawn from the supply hopper.

Provision is made for permitting two weighing operations to be performed on the scale beam 18 during each cycle of operation, first a bulk load and then a drip or final weight load. As shown in Figs. 3 and 4, the scale beam 18 is mounted on knife edges 148 in the usual manner, having the receptacle 16 at the weighing end and being provided with the usual counterweight 150 at its other end. The counterweight end of the scale beam is also provided with an extension 152 which carries the electrical contact 88 previously referred to. In its normal or inoperative position, the scale beam rests against a bearing member 154 to maintain the scale level and in which position the contacts 88, 90 are closed. In order to permit the scale to perform two successive weighing operations during one cycle of operation, provision is made for decreasing the effective counterweight during the bulk weighing operation, and for increasing the effective counterweight during the final weighing operation. As herein shown, see Figs. 3 and 4, an auxiliary counterweight 156 is arranged to be applied to the weighing end of the scale beam during the bulk period of operation. The auxiliary counterweight is suspended from a plate 157 which is connected by a link 158 to an arm 160 pivotally mounted on a cross-shaft 162 mounted in suitable bearings in the machine frame. The plate 157 is provided with an opening 164 the upper end of which is arranged to engage a knife edge 166 extending laterally from the scale beam 18. Normally, the weight of the parts causes the arm 160 to rock in a clockwise direction viewing Fig. 3, to permit the counterweight to operatively engage the scale beam. The link 158 is provided with a slotted end 168 to permit the scale to be free from the influence of the connecting parts during the weighing operation. As illustrated in Fig. 4, the arm 160 is provided with a curved cam piece 170 arranged to be engaged by a roll 172 carried on the end of the arm 96. As a result of this construction, when the scale is tripped during the bulk weighing operation to release the armature 102, the lever 96 is caused to be rocked by the spring 104 and the engagement of the roll 172 with the cam piece 170 causes the arm 160 to be rocked counterclockwise, viewing Fig. 4, and to raise the counterweight to the position shown therein so that the scale beam is permitted to return to its weighing position in readiness for the final weighing operation. This movement of the scale beam reestablishes the contacts 88, 90 as illustrated in Fig. 3. Thus, at the end of the bulk period of operation, the gate 80 is closed simultaneously with the lifting of the counterweight from the weighing end of the scale beam.

Provision is also made at this time for shunting the current to permit the electromagnet 86 to be deenergized upon tripping of the scale beam during the final weighing operation. As illustrated in Figs. 3, 4 and 6, a three pole mecury switch 174 is pivotally mounted upon a stud 176 carried in a bracket 178 mounted on a cross-bar 180 secured to the machine frame. A pivotally mounted latch member 182 normally held in the dotted line position shown in Fig. 4 by a spring 184 is arranged to engage the latching end 186 of the mercury switch mounting to hold the latter in the angular position shown in full lines in Fig. 4, during the bulk load weighing operation. As herein shown, an abutment 188 of the arm 160 is arranged to engage a second arm 190 of the latch member 182 in order to rock the latter to the full line position shown in Fig. 4 to release the mercury switch mounting 174. The other end of the switch mounting is provided with a counterweight 192 which causes the pivotally mounted switch to rock to the dotted line position shown in Fig. 4. Thus the mercury in the switch is caused to flow from a position such as is shown at A in Fig. 6 where the circuit is closed through poles 194, 196 to the position shown at B in Fig. 6 to close the circuit through poles 196, 198.

Referring now particularly to Fig. 6, the circuits to the electromagnets 84, 86 of the weighing units, are arranged in parallel, each current being arranged to flow through leads 200, 202 to the electromagnet 84 and from the electromagnet through the lead wire 204, through contacts 88, 90 and through leads 206, 208 to complete the circuit to the electromagnet for controlling the bulk weighing operation. It will be observed that when the mercury switch 174 is in the position indicated at A and C, the current to the electromagnet 86 is arranged to by-pass the contacts 88, 90 and to maintain the circuit to the electromagnet 86 during the bulk weighing operation. As shown in Fig. 6, the current is arranged to flow through leads 200, 210 to the electromagnet 86 thence through lead wire 212 to the pole 196 and from pole 194 through lead 214 to the return wire 208.

In the operation of the machine, when the contacts 88, 90 are opened at the end of the bulk weighing period, the mercury switch is released to be rocked to the position shown at B. However, before the switch 174 has traveled far enough to entirely break the circuit between poles 194, 196, the contacts 88, 90 are again closed by the resetting of the scale beam, as described. Hence, the current is constantly maintained through the electromagnet 86 during the movement of the switch 174 and when the latter arrives in its fully tilted position, as shown at B, the circuit is closed through the poles 196, 198, lead wire 216, through contacts 88, 90 and leads 206, 208. In this manner, the current is shunted through the contacts 88, 90 to enable the electromagnet 86 to be deenergized when the scale is tripped the second time, that is, at the end of the final weighing operation. Thus, when the final weight is reached, the electromagnet 86 is deenergized to release the armature 116 and to rock the arm 110 to close the gate 82. It will also be observed that rocking of the arm 110 moves the pawl 128 into engagement with the ratchet 124 to stop rotation of the feed drum 14.

At the end of the final weighing operation, provision is made for releasing the weighed loads in the receptacles to permit the material to fall by gravity through the funnels 20 and into the cartons 22 placed therebeneath. As herein shown, the bottom of the receptacle comprises two shutters 240, 242 pivotally mounted on the receptacles and normally held in their abutting and closed position by springs 244, 246. The shutters are connected by toggle links 248, 250 provided with a roller 252 at their connected ends adapted to be engaged by an arm 254 to operate the toggle linkage to effect opening of the shutters. As illustrated in Fig. 3, the arm 254 is arranged to be operated through connections from a cam 256, fast upon a one revolution cam shaft 258 journalled in suitable bearings in the machine frame. A bell crank 260 pivotally mounted on a cross-shaft 264 carries a roller 266 on one arm, the other arm being connected by a link 268 to a lever 270 clamped to a rocker shaft 272. The operating arms 254 are also fast upon the rocker shaft 272 so that through the connections described, the receptacles are opened to deliver the weighed loads to the packages.

Provision is also made at the end of the final weighing operation, for resetting the parts into their original position in order to enable the scales to perform another cycle of operation. As illustrated in Fig. 3, the armatures 102, 116 of the electromagnets 84, 86 respectively, are arranged to be returned into operative engagement with their electromagnets through connections from a cam 218 mounted fast upon the cam shaft 258. The cam 218 is arranged to cooperate with a roller 222 carried by a cam lever 224 pivotally mounted at 264 and the lever 224 is connected by a link 228 to an arm 230 clamped on a rocker shaft 232. The rocker shaft is provided with rocker arms 234, 236 fast thereon which are arranged to engage rollers 172, 238 carried by arms 96, 110 respectively to rock the latter on their pivots 98, 112 and to effect the resetting operation. It will be observed that this resetting operation also permits the arm 160 to be rocked on its pivot 162 to return the auxiliary counterweight 156 to the weighing end of the scale beam and to release the latch member 182 to permit it to return to its latching position. It will also be observed that resetting of the arm 110 effects removal of the pawl 128 to permit the drum 14 to be again rotated to feed the material, as described.

Provision is also made for returning the pivotally mounted mercury switch 174 to its latched position, as shown in Fig. 4, through connections from a cam 274 fast on the cam shaft 258. A cam roller 276 carried by a lever 278 clamped on rocker shaft 280 cooperates with the cam, and the rocker shaft is provided with resetting arms 282 fast thereon which are arranged to engage the counterweight end of the pivotally mounted switch to rock the same counterclockwise viewing Figs. 3 and 4. When the latching end of the switch 174 engages the latch member 182, the latter is yieldingly urged back and when the latching end continues beyond the member 182 the latter is rocked into the path of the latching end to retain the switch 174 in the position shown in full lines in Fig. 4. A spring 284 connected to the cam lever 278 is provided to hold the cam roller 276 against its cam 274.

As illustrated in Figs. 1 and 2, the cam shaft 258 is arranged to be rotated through connections from the speed reduction unit 138 including a pinion 286 and gear 288, the latter being formed integrally with a ratchet 290 forming part of a one revolution clutch. The integral gear 288 and ratchet 290 are rotatably mounted on the cam shaft 258 and a disk 292 fast upon the cam shaft carries a pawl 294 arranged to engage the teeth of the ratchet to effect rotation of the shaft.

Provision is made for controlling the operation of the shaft 258 to permit it to make but one revolution per cycle of operation, and as herein shown, a pawl stop 296 slidingly mounted in a bracket 298 is arranged to engage the tail of the pawl 294 to remove the latter from engagement with the teeth of the ratchet when the shaft has made one revolution. The pawl stop 296 is connected by a link 300 to one arm 302 of a lever pivotally mounted at 304. A spring 306 connected to the arm 302 tends to urge the parts in a direction to remove the pawl stop from engagement with the pawl to permit the shaft 258 to be rotated one revolution when the machine has completed its previous weighing cycle and when other conditions have been satisfied, as will be described.

Provision is made for assuring a supply of cartons beneath the funnels 20 before the machine is permitted to start a new cycle of operations. Referring now to Figs. 2, 7 and 8, provision is made for permitting the pawl stop 296 to be removed and to permit the machine to start a new cycle of operation through connections from the pivotal stop member 26 which, when rocked to the dotted line position shown in Fig. 7 by the incoming cartons, is arranged to effect closing of a circuit to an electromagnet 308, see Fig. 2. As shown in Fig. 8, the lower end of the vertical rod 28 is provided with an abutment 310 which is normally pressed against a spring 301 having a contact 312 to open the circuit to the electromagnet at contact points 312, 324, by the influence of a counterweighted bell-crank 314 having an arm 316 provided with a roller 318 in engagement with an extension 320 of the stop member 26. Set screws 322 limit the movement of the member 26 in either direction. When the line of cartons is released and engages the stop member 26, the effect of the counterweight is overcome and the resiliency of the flat spring 301 permits the contact 312 to engage with the stationary contact 324 to close the circuit to the electromagnet 308. The electromagnet 308, see Fig. 2, is connected to a latch 325 pivotally mounted at 326 and which is arranged to engage an arm 328 formed integrally with the arm 302 to retain the pawl stop 296 in engagement with its pawl 294. A spring 330 connected to the latch 325 normally holds the latter in its latching position, as shown in Fig. 2. When the electromagnet 308 is energized, its armature 332 is raised to release the arm 328 and to permit the pawl stop to be withdrawn. Thus, in the event that the supply of cartons has been depleted the stop member 26 will not be rocked and the machine cannot start a new cycle of operation, in this manner assuring a supply of containers beneath the funnels 20 to receive the material released from the receptacles 16.

Provision is made for preventing the withdrawal of the pawl stop 296 unless all of the weighing units have completed their weights. As illustrated in Figs. 2 and 3, each gate 82 is provided with an arm 334 having a roller 336 arranged to engage its individual cam arm 338 fast on a rocker shaft 340 journalled in suitable bearings in the machine frame. A lever 342 attached to one end of the rocker shaft 340 is connected by a link 344 to an arm 346 formed integrally with the pawl withdrawing arm 302. As shown in Fig. 2, when the gates 82 are opened during the weighing operation, each roller 336 holds its cam arm 338 in a position such as to prevent withdrawal of the pawl stop. The link 344 is slidably received in a swivelled mounting 348 carried by the arm 346. A collar 350 fast on the link engages the swivel 348 to hold the pawl stop 296 in, as shown in Fig. 2. In operation, as each scale trips at the end of its weighing cycle and the gates 82 are shut, the rollers 336 are removed from engagement with the cam arms 338, see Fig. 3, and when the final scale has tripped, the shaft 340 is permitted to rock to allow withdrawal of the pawl stop when the electromagnet is energized, as described. However, in the event that one or more of the scales have not completed their weighing operation, the lever 342 is held in the position shown in Fig. 2 to prevent the machine from starting a new cycle of operation. It will be observed that normally when the pawl stop is withdrawn to permit the shaft 258 to rotate, the resetting of the gates 80, 82, effected by the cam 218, operates through the rollers 336 and cam arms 338 to rock the shaft 340 to the position shown in Fig. 2, thus effecting resetting of the arm 328 with its latch 325 through the connections described.

Referring now to Figs 1 and 2, provision is made for controlling the operation of the conveyer cam shaft 36 through connections from the weighing units whereby to prevent the cartons from being released unless all of the weighing units have completed their weighing operations. As herein shown, the ratchet 70 of the pawl and ratchet clutch 72 is arranged to be engaged by a pawl 352 carried in a disk 354 fast on the conveyer cam shaft 36. A pawl stop 356 slidingly mounted in a bracket 358 is arranged to engage the tail of the pawl 352 to disengage the latter from its ratchet 70 and thus prevent rotation of the cam shaft 36. The pawl stop 356 is connected by a link 360 to one arm 362 of a bell-crank pivoted at 364 in a bracket 366 attached to the machine frame. The second arm 368 of the bell-crank is connected by a link 370 to the lever 342. With this construction it will be observed that the pawl stop 356 is withdrawn when the lever 342 is permitted to rock in a counterclockwise direction, viewing Fig. 2, when all the gates 82 have been closed, indicating completion of the weighing operations. In the event that all of the weighing operations have not been completed, the lever 342 will be held in the position shown in Fig. 2 by the rollers 336 and arms 338 thus preventing withdrawal of the pawl stop 356. It will also be observed that the pawl stops 296, 356 are simultaneously withdrawn and that resetting of the pawl stop 296 through the connections described will likewise effect resetting of the pawl stop 356 to disengage their respective pawls from their ratchets at the end of one revolution of operation of the machine. Any suitable means may be provided to prevent overthrow or backlash of the cam shafts beyond the point where the pawl is disengaged from its ratchet, such as a roller 372 arranged to yieldingly engage the periphery of the pawl carrying disk 292 and which is arranged to seat itself in a cut-out portion 374 of the disk when the latter is released by the ratchet 290.

Referring now generally to Figs. 3, 4 and particularly to Fig. 9, provision is made as therein shown for enabling the machine to be operated to perform but one weighing operation per cycle of operation. In practice, it has been found that when weighing some materials, sufficiently accurate weights may be had by weighing only the bulk load into the receptacle, thus eliminating the final or drip weighing period in the cycle of operation and permitting the machine to be operated at an increased speed of production. For this purpose provision is made for rendering inoperative the auxiliary counterweight mechanism and the circuit shunting mechanism hereinbefore described. As herein illustrated, the counterweight supporting arm 160 is arranged to be engaged by one arm 376 of a two-armed lever fixed to an elongated shaft 378 when the latter is rotated whereby to lock the counterweight arm 160 in its raised position and to free the scale from the influence of the auxiliary counterweight 156. A handle wheel 380 is provided on the end of the shaft 378 by which the latter may be manually adjusted. A second arm 382 of the two-armed lever is arranged to engage an extension 384 of the cam lever 278 and to lock the same in the position shown in Fig. 9, so as to prevent the operation of the resetting arm 282 for the pivotally mounted mercury switch 174 and permitting the latter to remain in the position shown in Fig. 9 by the influence of the counterweight 192. It will be observed that locking of the counterweight arm 160 also rocks the latch 182 into its inoperative position thus freeing the switches 174. By reference to Fig. 6 it will be observed that when all the switches 174 are disposed in the angular position as indicated at B, both electromagnets 84, 86 are arranged to be simultaneously deenergized upon opening of the circuit at the scale contacts 88, 90. Thus, in operation, when the bulk load is delivered to the receptacle 16, the material will continue to flow until the weight is reached whereupon both gates 80, 82 of the feed hopper are simultaneously closed.

A brief summary of the operation of the machine, when operating on bulk and drip periods of weighing per each cycle of operation may be described as follows. The material is fed from the supply hopper 10 into the feed hopper 12 by rotating drums 14 and when the gates 80, 82 are open, the material will flow directly into the receptacle 16 of the scale beam. When a predetermined weight of material has been deposited into the receptacle, the scale beam is tipped to open the circuit at contacts 88, 90 to the electromagnet 84 whereupon the armature 102 is released, the gate 80 is closed, the counterweight 156 is raised off the scale beam, and the switch 174 is released to permit it to move into a position to shunt the current for the electromagnet 86 through the contacts 88, 90, the latter being reestablished upon the return of the scale beam to its level position when the counterweight 156 is raised. During this time the material continues to flow through the passageway 78 of the feed hopper, material also flowing into the compartment 76 to be accumulated therein and to form the bulk load for a subsequent weighing operation. When a predetermined weight of material has been deposited into the receptacle during the drip period of weighing, the scale 18 is tipped a second time, again opening the circuit at contacts 88, 90 and this time releasing the armature 116 from its electromagnet 86 thus closing the gate 82 and stopping the feed drum 14. When the last scale of the group has completed its weighing operation, the pawl stop 296 is permitted to be withdrawn to permit the cam shaft 258 to rotate one revolution and to effect resetting of the parts to start another weighing cycle. Simultaneously therewith, the pawl stop 356 is withdrawn to permit the cam shaft 36 to be rotated to allow a new group of cartons 22 to be released and advanced into position beneath the funnels 20, and the filled cartons to be delivered from the machine. The cams 34 and 47 of the carton stop and releasing device are designed to permit the cartons released during the previous cycle to remain in position until they have received their load from the receptacles 16. Thereafter, when the new group of cartons has been released and the line of cartons from the supply engages the stop 26, the electromagnet 308 is energized to withdraw the latch 325 to permit withdrawal of the pawl stop 296 when all the scales have again completed their weights during a subsequent cycle of operation. In practice, this action is continuous, there being no perceptible stop in the rotation of the cam shafts when operating under normal conditions.

While the preferred embodiment of the invention has been herein illustrated and described, it will be understood that the invention may be embodied in other forms within the scope of the following claims.

Having thus described the invention, what is claimed is:

1. In a weighing machine, in combination, a scale including a scale beam, material feeding means having provision for delivering a bulk stream and a drip stream onto the scale including a pair of independently operated gates, means for counterbalancing the scale beam so that said scale beam will be depressed when a predetermined weight of material has been deposited thereon, control mechanism actuated by one depression of the scale beam to terminate the delivery of the bulk stream and to permit the uninterrupted continuance of delivery of the drip stream, said control mechanism being actuated by a second depression of the scale beam to terminate said drip stream, and means for increasing the effective counterbalance of the scale beam after the bulk weighing operation, constructed and arranged to cause the scale beam to return to its predepressed position to weigh the drip load, said control mechanism including an individual solenoid for each gate arranged to be independently actuated to close one gate upon the first depression of said scale beam and to close the remaining gate upon the second depression of the scale beam.

2. In a multi-unit weighing machine, in combination, a plurality of weighing units each provided with a scale beam and each provided with means for delivering a bulk stream and a drip stream onto the scale beam including a pair of independently operated gates, means for counterbalancing each scale beam so that it will be depressed when a predetermined weight of material has been deposited thereon, a one revolution clutch, control mechanism including connections to said one revolution clutch operative to permit each weighing unit to operate to weigh a bulk and a drip load during one cycle independently of the remaining units, said control mechanism being actuated by one depression of the scale beam to close one of said gates to terminate the bulk stream and permit the uninterrupted continuance of the delivery of the drip stream and being actuated by a second depression of the scale beam to close the remaining gate to cut off the drip stream, said control mechanism also including means for increasing the effective counterbalance of the individual scale beams after the bulk weighing operation is completed, whereby the scale beam is returned to its predepressed position to weigh the drip load, said control mechanism also having provision for preventing the initiation of a succeeding complete weighing cycle until all of the drip loads have been weighed by the various weighing units said latter provision being operative to release said one revolution clutch only when all of the drip loads have been completed.

3. In an automatic weighing machine, in combination, a scale including a scale beam, material feeding means including a feed hopper provided with two gates, one gate controlling the bulk stream and the second gate controlling the drip stream, a solenoid controlled by one movement of the scale beam for closing one of the gates when a predetermined weight is reached while permitting the second gate to remain open whereby to permit uninterrupted continuance of the drip stream, means for increasing the effective counterweight on the scale beam constructed and arranged to cause it to return to its predepressed weighing position after said first gate is closed, and a second solenoid controlled by a subsequent movement of the scale beam when a predetermined weight is reached for closing the second gate.

4. In an automatic weighing machine, in combination, a scale including a scale beam, material feeding means including a pair of gates having provision for feeding a bulk stream and a drip stream, means including a pair of solenoids operatively connected to said gates and controlled by the movement of the scale beam for terminating the bulk and drip streams, said means being operative to terminate the bulk stream when a predetermined weight is reached while permitting uninterrupted continuance of the delivery of the drip stream, means for increasing the effective counterweight of the scale beam constructed and arranged to cause it to return to its predepressed weighing position when the bulk stream is terminated, and means controlled by a subsequent movement of the scale beam when a predetermined weight is reached for terminating the drip stream.

5. In a multi-unit weighing machine of the type operating to perform the weighing operation in successive cycles, each cycle comprising a bulk weighing operation and a drip weighing operation, in combination, a plurality of weighing units having individual scale beams, each unit being arranged to perform a bulk weighing and a drip weighing, means for increasing the effective counterweight of said individual scale beams when their respective bulk weighing is completed, said means being constructed and arranged to cause the scale beams of the several units to return to their predepressed weighing positions, and means for permitting an individual weighing unit to perform its drip weighing operation independently of the completion of the bulk weighing operation by the other units, and means for preventing all of the weighing units from starting on a succeeding cycle until all of the units have completed their drip operations.

6. In a multi-unit weighing machine of the type operating to perform the weighing operation in successive cycles, each cycle comprising a bulk weighing operation and a drip weighing operation, in combination, a plurality of weighing units having individual scale beams, each unit being arranged to perform a bulk weighing and a drip weighing, means actuated by movement of the scale beam for controlling the bulk weighing of the individual unit, means for increasing the effective counterweight of said individual scale beams when their respective bulk weighing is completed, said means being constructed and arranged to cause said scale beams to return to their predepressed positions, means for permitting an individual weighing unit to perform its drip weighing operation independently of the completion of the bulk weighing operation by the other units, and means for preventing all of the weighing units from starting on a succeeding cycle until all of the units have completed their drip operations.

7. In a multi-unit weighing machine of the type operating to perform the weighing operation in successive cycles, each cycle comprising a bulk weighing operation and a drip weighing operation, in combination, a plurality of weighing units having individual scale beams, each unit being arranged to perform a bulk weighing and a drip weighing, means actuated by movement of the scale beam for controlling the bulk weighing of the individual unit, said means being constructed and arranged to cause said individual scale beams to return to their respective predepressed weighing positions after the bulk weighing has been completed, means for permitting an individual weighing unit to perform its drip weighing operation independently of the completion of the bulk weighing operation by the other units, and means for preventing all of the weighing units from starting on a succeeding cycle until all of the units have completed their drip operations.

8. In a multi-unit weighing machine of the type operating to perform the weighing operation in successive cycles, each cycle comprising a bulk weighing operation and a drip weighing operation, in combination, a plurality of weighing units having individual scale beams, each unit being arranged to perform a bulk weighing and a drip weighing, means for increasing the effective counterweight of said individual scale beams when their respective bulk weighing is completed, said means being constructed and arranged to cause said individual scale beams to return to their respective predepressed positions after the bulk weighing has been completed, and means for permitting an individual weighing unit to perform its drip weighing operation independently of the completion of the bulk weighing operation by the other units, said last named means including an electrical circuit having a switch arranged to be opened to effect discontinuance of said bulk weighing operation and to be again closed when said scale beam is returned to weighing position, means in said circuit for maintaining the current independently of said switch to effect uninterrupted continuance of the drip feed, said last named means being adapted to effect shunting of the current through said switch whereby the scale beam is permitted to discontinue the drip weighing when said scale beam is moved to open said switch a second time, and means for preventing all of the weighing units from starting on a succeeding cycle until all of the units have completed their drip operations.

9. In a multi-unit weighing machine of the type operating to perform the weighing operation in successive cycles, each cycle comprising a bulk weighing operation and a drip weighing operation, in combination, a plurality of weighing units having individual scale beams, each unit being arranged to perform a bulk weighing and a drip weighing, means for increasing the effective counterweight of said individual scale beams when their respective bulk weighing is completed, said means being constructed and arranged to cause said individual scale beams to return to their respective predepressed positions after the bulk weighing has been completed, and means for permitting an individual weighing unit to perform its drip weighing operation independently of the completion of the bulk weighing operation by the other units, said last named means including an electrical circuit having a scale operated switch arranged to be opened to effect discontinuance of said bulk weighing operation and to be again closed when said scale beam is returned to weighing position, and a mercury switch in said circuit adapted to be automatically moved after the individual bulk weighing is completed for shunting the current so as to permit the scale beam to discontinue the drip weighing when said scale beam is moved to open the scale operated switch a second time, and means for preventing all of the weighing units from starting on a succeeding cycle until all of the units have completed their drip operations.

10. In a multi-unit weighing machine of the type operating to perform the weighing operation in successive cycles, each cycle comprising a bulk weighing operation and a drip weighing operation, in combination, a plurality of weighing units having individual scale beams, each unit being arranged to perform a bulk weighing and a drip weighing, means for increasing the effective counterweight of said individual scale beams when their respective bulk weighing is completed, said means being constructed and arranged to cause said individual scale beams to return to their respective predepressed positions after the bulk weighing has been completed, and means for permitting an individual weighing unit to perform its drip weighing operation independently of the completion of the bulk weighing operation by the other units, said last named means including an electrical circuit having a scale operated switch arranged to be opened to effect discontinuance of said bulk weighing operation and to be again closed when said scale beam is returned to weighing position, and a mercury switch in said circuit adapted to be automatically moved after the individual bulk weighing is completed for shunting the current so as to permit the scale beam to discontinue the drip weighing when said scale beam is moved to open the scale operated switch a second time, and manually operated means for locking said mercury switch in a position to permit said bulk and drip streams to be cut off simultaneously.

11. In a multi-unit weighing machine of the type operating to perform the weighing operation in successive cycles, each cycle comprising a bulk weighing operation and a drip weighing operation, in combination, a plurality of weighing units having individual scale beams, each unit being arranged to perform a bulk weighing and a drip weighing, means for increasing the effective counterweight of said individual scale beams when their respective bulk weighing is completed, said means being constructed and arranged to cause said scale beams to return to their predepressed positions, and means for permitting an individual weighing unit to perform its drip weighing operation independently of the completion of the bulk weighing operation by other units, said last named means including means for preventing all of the weighing units from starting on a succeeding cycle until all of the units have completed their drip operations.

12. In an automatic weighing machine, in combination, a scale including a scale beam, material feeding means including a feed hopper provided with two gates, means including a solenoid controlled by one movement of the scale beam for closing one of the gates when a predetermined weight is reached while permitting the second gate to remain open, means for increasing the effective counterweight on the scale beam constructed and arranged to cause it to return to weighing position after said first gate is closed, and means including a second solenoid controlled by a subsequent movement of the scale beam when a predetermined weight is reached for closing the second gate, said feed hopper being relatively wide and adapted to permit a relatively thick stream of material to be fed during the bulk weighing operation, said gates being arranged so as to cut down the width of said stream when said one gate is closed at the end of the bulk weighing to narrow the width of said stream while maintaining the thickness thereof during the drip weighing period.

13. In an automatic weighing machine, in combination, a scale including a scale beam, material feeding means including a feed hopper provided with two gates, one of the gates controlling the bulk stream and the second controlling the drip stream, means controlled by one movement of the scale beam for closing one of the gates when a predetermined weight is reached while permitting the second gate to remain open, means for increasing the effective counterweight on the scale beam to permit it to return to weighing position after said first gate is closed, and means controlled by a subsequent movement of the scale beam when a predetermined weight is reached for closing the second gate, said gate closing means including an electrical circuit, a pair of electromagnets in said circuit, adapted to hold said gates open when they are energized, a switch operated by movement of the scale beam to open the circuit to deenergize said electromagnets and permit said gates to be closed, and a mercury switch arranged in said circuit controlled by the movement of said scale beam for shunting the current so as to enable one electromagnet to be deenergized upon the first movement of the scale beam while maintaining the current through the second electromagnet and to enable the second electromagnet to be deenergized upon a succeeding movement of the scale beam.

14. In an automatic weighing machine, in combination, a scale including a scale beam, material feeding means including a feed hopper provided with two gates, one of the gates controlling the bulk stream and the second controlling the drip stream, means controlled by one movement of the scale beam for closing one of the gates when a predetermined weight is reached while permitting the second gate to remain open, means for increasing the effective counterweight on the scale beam to permit it to return to weighing position after said first gate is closed, and means controlled by a subsequent movement of the scale beam when a predetermined weight is reached for closing the second gate, said controlling means including an electrical circuit having a pair of electromagnets, connections between said electromagnets and said gates arranged to hold the latter open when the electromagnets are energized, means in said circuit for permitting said gates to be independently closed upon alternate movements of the scale beam to open the circuit, said means for increasing the effective counterweight including a rockingly mounted lever arranged to be engaged upon closing of the first gate to effect an increase in the effective counterweight and to shunt the current in said circuit through the second electromagnet to enable the second gate to be closed upon a succeeding movement of the scale beam.

15. In an automatic weighing machine, in combination, a scale including a scale beam, material feeding means including a rotating drum, a feed hopper provided with two gates, one of the gates controlling the bulk stream and the second controlling the drip stream, means controlled by one movement of the scale beam for closing one of the gates when a predetermined weight is reached while permitting the second gate to remain open, means for increasing the effective counterweight on the scale beam to permit it to return to weighing position after said first gate is closed, and means controlled by a subsequent movement of the scale beam when a predetermined weight is reached for closing the second gate, said controlling means including an electrical circuit having a pair of electromagnets, connections between said electromagnets and said gates arranged to hold the latter open when the electromagnets are energized, means in said circuit for permitting said gates to be independently closed upon alternate movements of the scale beams to open the circuit, said means for increasing the effective counterweight including a rockingly mounted lever arranged to be engaged upon closing of the first gate to effect an increase in the effective counterweight and to shunt the current in said circuit through the second electromagnet to enable the second gate to be closed upon a succeeding movement of the scale beam, and means operative upon closing of the second gate for terminating the rotation of said feed drum.

16. In a multi-unit weighing machine, in combination, a plurality of weighing units each provided with a scale beam and each provided with means including a gate for delivering a bulk stream and a second gate for delivering a drip stream onto the scale beam, means for counterbalancing each scale beam so that it will be depressed when a predetermined weight of material has been deposited thereon, electrical control mechanism including a scale operated switch constructed and arranged to be twice actuated and a pair of individual solenoids operatively connected to their respective bulk and drip gates and adapted to be individually controlled by said switch for permitting each weighing unit to operate during each cycle independently of the remaining units to weigh both bulk and drip loads, said control mechanism being actuated by one depression of the scale beam to terminate the bulk stream and to permit uninterrupted continuance of the delivery of the drip stream, means for increasing the effective counterweight on the scale beam after the bulk load has been weighed to permit said scale beam to return to its predepressed position, said control means being actuated by a second depression of the scale beam to cut off the drip stream, and manually operated means for modifying said control mechanism to permit both the drip and bulk streams to be simultaneously terminated upon a single depression of the scale beam whereby to permit the machine to operate to weigh a final load in a single cycle of operation of the machine, and means for preventing all of the weighing units from starting on a succeeding cycle until all of the units have completed their drip operations.

17. In a weighing machine, in combination, a scale beam, means including a gate for delivering a bulk stream and a second gate for delivering a drip stream onto the scale beam, and electrical control mechanism including a scale operated switch constructed and arranged to be twice actuated and a pair of individual solenoids operatively connected to their respective gates adapted to be individually controlled by said switch and having provision for varying the effective counterweight whereby to permit two weighing operations with the single scale beam to be performed in each cycle of operation of the machine, and means for modifying said control mechanism to permit both the drip and bulk streams to be simultaneously terminated upon a single depression of the scale beam in each cycle whereby to permit the machine to operate a final load in each single cycle of operation thereof.

18. In a multi-unit weighing machine of the type operating to perform the weighing operation in succeeding cycles, each comprising a bulk weighing and a drip weighing, in combination, a plurality of weighing units each having a scale beam, material feeding means having provision for feeding a bulk stream and a drip stream, control means including a solenoid actuated gate for controlling the bulk stream and a solenoid operated gate for controlling the drip stream, said control means being operative to terminate each bulk stream when a predetermined weight has been deposited on the respective scale beam, means for increasing the effective counterweight of each scale beam after the bulk weighing operation has been completed by the individual weighing unit, said means being constructed and arranged to cause the scale beams of the several units to return to their predepressed weighing position independent of one another, means for permitting the individual scale beams of the several units to perform their drip weighing operations independently of one another, and means for preventing all of the weighing units from starting on a succeeding cycle until all of the units have completed their drip operations.

STANLEY R. HOWARD.